United States Patent
Sakurai

(10) Patent No.: US 8,208,037 B2
(45) Date of Patent: Jun. 26, 2012

(54) DIGITAL CAMERA AND GAIN COMPUTATION METHOD

(75) Inventor: Junzo Sakurai, Tokyo (JP)

(73) Assignee: Eastman Kodak Company, Rochester, NY (US)

( * ) Notice: Subject to any disclaimer, the term of this patent is extended or adjusted under 35 U.S.C. 154(b) by 570 days.

(21) Appl. No.: 11/312,097

(22) Filed: Dec. 20, 2005

(65) Prior Publication Data

US 2007/0024719 A1 Feb. 1, 2007

(30) Foreign Application Priority Data

Jul. 29, 2005 (JP) .................................. 2005-220063

(51) Int. Cl.
*H04N 5/76* (2006.01)
*H04N 9/73* (2006.01)

(52) U.S. Cl. ..................................... 348/223.1; 348/655

(58) Field of Classification Search ............... 348/224.1, 348/223.1
See application file for complete search history.

(56) References Cited

U.S. PATENT DOCUMENTS

| | | | | | |
|---|---|---|---|---|---|
| 5,504,525 | A | * | 4/1996 | Suzuki | 348/223.1 |
| 5,691,772 | A | * | 11/1997 | Suzuki | 348/223.1 |
| 5,995,142 | A | * | 11/1999 | Matsufune | 348/223.1 |
| 6,727,942 | B1 | * | 4/2004 | Miyano | 348/223.1 |
| 6,791,606 | B1 | * | 9/2004 | Miyano | 348/223.1 |
| 7,286,703 | B2 | * | 10/2007 | Kaku | 382/167 |
| 7,289,663 | B2 | * | 10/2007 | Spaulding et al. | 382/167 |
| 7,355,636 | B2 | * | 4/2008 | Takeuchi | 348/223.1 |
| 7,969,483 | B2 | * | 6/2011 | Takasumi | 348/223.1 |
| 2003/0011686 | A1 | * | 1/2003 | Higuchi | 348/223.1 |
| 2003/0189650 | A1 | * | 10/2003 | Gindele et al. | 348/223.1 |
| 2004/0012690 | A1 | * | 1/2004 | Makioka | 348/222.1 |
| 2004/0095478 | A1 | * | 5/2004 | Takano et al. | 348/223.1 |
| 2004/0135899 | A1 | * | 7/2004 | Suemoto | 348/223.1 |
| 2004/0201727 | A1 | * | 10/2004 | Ichikawa et al. | 348/223.1 |
| 2004/0212691 | A1 | * | 10/2004 | Sato | 348/223.1 |
| 2004/0233298 | A1 | * | 11/2004 | Aotsuka | 348/223.1 |
| 2005/0122409 | A1 | * | 6/2005 | Takeshita | 348/223.1 |
| 2005/0259160 | A1 | * | 11/2005 | Une | 348/223.1 |
| 2006/0044422 | A1 | * | 3/2006 | Miyazaki | 348/234 |

FOREIGN PATENT DOCUMENTS

| | | |
|---|---|---|
| JP | 06-165189 | 6/1994 |
| JP | 2000092509 | 3/2000 |
| JP | 2001112019 | 4/2001 |
| JP | 2001223979 | 8/2001 |
| JP | 2003324744 | 11/2003 |

* cited by examiner

*Primary Examiner* — Sinh Tran
*Assistant Examiner* — Selam Gebriel
(74) *Attorney, Agent, or Firm* — Pamela R. Crocker; Christopher J. White

(57) ABSTRACT

For computing a plurality of white balance gains with regard to a single image data item, a target image is first divided into a plurality of blocks. Then, a representative value of each block is computed, and a value representing the relative contribution of each light source type to a whole image is calculated based on the representative value which is obtained. Once the representative value of each block and the contribution level of each type of light source are obtained, a MWB gain and an AWB gain are computed using these results. Because the computation of the representative value of each block, which is a calculation operation performed for each pixel, is performed only once, the computation time can be greatly reduced.

6 Claims, 11 Drawing Sheets

DIGITAL CAMERA AND GAIN COMPUTATION METHOD

FIELD OF THE INVENTION

The present invention relates to a digital camera in which at least two types of white balance gains are computed with regard to a single image data item, and to a method of computing a white balance gain.

BACKGROUND OF THE INVENTION

White balance (WB) adjustment is a known processing in which a gain with respect to a color signal of each pixel forming digital image data is changed to provide image data having an appropriate color tone. Digital cameras are provided with an internal WB adjusting function for computing a WB gain in accordance with the user's setting before image capturing, thereby performing WB adjustment with respect to image data obtained by the image capturing. With regard to the WB gain computation, a large number of techniques have conventionally been proposed, including those disclosed in Japanese Patent Laid-Open Publications Nos. 2001-112019, 2000-92509, and 2003-327744.

In general, image data which has been subjected to compression processing as well as such WB adjustment is recorded, as a compressed image file, on a recording medium which records captured image data. While the compressed image file has an advantage that it provides a user with ease in handling because of a small data amount, it suffers from problems that the image quality is deteriorated due to the compression processing and that it is difficult to subject such a compressed image file to further image correction. In particular, while the WB adjustment is generally performed using the user's setting at the time of image capturing, there are instances where such user setting is not appropriate. In such instances, if the user attempts to perform further WB adjustment with respect to the compressed image using different setting, the image quality would be deteriorated.

In order to address the above problems, in recent years, cameras provided with a white balance bracketing function for creating a plurality of compressed image files subjected to different WB adjustment processes by a single image capturing operation have been known.

In addition, digital cameras which record RAW data obtained by digitizing an image capturing signal are also known. As the RAW data is image data which is not subjected to compression processing or WB adjustment, further WB adjustment can be performed without deterioration of the image quality.

When outputting such RAW data, the WB gain of the RAW data is recorded as well. Recording of the WB gains enables WB adjustment to be performed easily by an external image processing apparatus. The above-described Japanese Patent Laid-Open Publication No. 2003-324744 discloses that both color gain information based on the setting at the time of image capturing and color gain information for manual white balance which has been adjusted by assuming the image capturing under a variety of light sources is recorded with regard to one RAW data item. By recording a plurality of WB gains with regard to a single RAW data item in this manner, it is possible to perform appropriate WB adjustment even if the WB setting at the time of image capturing is erroneous.

When performing white balance bracketing, however, it is naturally necessary to compute a plurality of WB gains with regard to a single image data item. In a case where a plurality of WB gains are recorded with regard to one RAW data item as disclosed in the above-described Japanese Patent Laid-Open Publication No. 2003-324744, it is similarly necessary to compute a plurality of WB gains. In this case, there has been a problem that it takes a long time to compute a plurality of WB gains in accordance with a WB gain computation technique which has been proposed conventionally.

It is therefore an advantage of the present invention to provide a digital camera in which a plurality of WB gains can be computed in a short time and a gain computation method.

SUMMARY OF THE INVENTION

In accordance with the present invention, there is provided a digital camera in which at least two types of white balance gains are computed with regard to a single image data item, the digital camera comprising first gain computation means for computing, as a first gain, a white balance gain in accordance with a first light source condition, and second gain computation means for computing, as a second gain, a white balance gain in accordance with a second light source condition, wherein one of the first gain computation means and the second gain computation means computes, as an intermediate calculation result, one or more types of parameter values obtained by a calculation operation which is performed for each pixel, in the process of computing the white balance gain, and the other of the first gain computation means and the second gain computation means computes the white balance gain by using the intermediate calculation result.

In a preferable aspect, the intermediate calculation result includes a representative value of color values of a plurality of pixels forming each block. In another preferable aspect, the first gain computation means computes a contribution level of a light source type designated by a user to a whole image, and also computes, as the first gain, a manual white balance gain in accordance with the contribution level. Accordingly, the first gain computation means computes a manual white balance gain which is generally called "semi-auto" white balance.

In a further preferable aspect, if fluorescent light, which is a light source type, is designated by a user as the first light source condition, the first gain computation means includes fluorescent type determination means for determining a type of fluorescent light which was used as a light source when an image was actually captured based on the image data, and computation means for computing, as the first gain, a manual white balance gain using the type of fluorescent light determined by the fluorescent type determination means as a type of light source designated by the user.

In a still further preferable aspect, the second gain computation means includes contribution level computation means for obtaining a contribution level of each light source type to a whole image based on the representative value of each block, light source type determination means for determining a light source type at the time of image capturing based on the contribution level which is computed, and computation means for computing, as the second gain, an auto white balance gain in accordance with the light source type which is determined, and the contribution level computation means further includes specification means for specifying a block which falls within a color range for which erroneous determination of a light source type is likely to occur and excludes the block specified by the specification means when computing the contribution level.

According to the present invention, the intermediate calculation result computed by the first gain computing means is used to compute the first gain and the second gain. It is therefore possible to compute a plurality of WB gains in a relatively short time. Preferably, the color range for which erroneous determination of a light source type is likely to occur is a portion of a color range of a white object under each light source which is similar to a color range of a colored object under another light source.

In another preferable aspect, the digital camera further includes RAW image file output means for outputting RAW data obtained by digitizing an image capturing signal captured by imaging means in the form of an RAW image file, and when outputting the RAW image file from the RAW image file output means, the first gain computation means and the second gain computation means compute the first gain and the second gain, respectively, which are white balance gains of the RAW data, and the RAW image file output means records the first gain and the second gain which are computed in a header of the RAW image file.

In this case, if light source type at the time of image capturing is designated by a user as the first light source condition when an image is captured for generating the RAW data, the first gain computation means computes, as the first gain, a manual white balance gain in accordance with the light source type designated by the user, and the second gain computation means computes, as the second gain, an auto white balance gain in accordance with a light source type which is determined based on the RAW data.

In accordance with still another aspect of the present invention, there is provided a gain computation method for computing at least two types of white balance gains with regard to one image data item, comprising a first gain computation step for computing, as a first gain, a white balance gain in accordance with a first light source condition, and a second gain computation step for computing, as a second gain, a white balance gain in accordance with a second light source condition, wherein one of the first gain computation step and the second gain computation step includes an intermediate calculation result computation step for computing, as an intermediate calculation result, one or more types of parameter values obtained by a calculation operation which is performed for each pixel, in the process of computing the white balance gain, and the other of the first gain computation step and the second gain computation step computes the white balance gain by using the intermediate calculation result.

BRIEF DESCRIPTION OF THE DRAWINGS

Preferred embodiments of the present invention will be described in detail based on the following figures, wherein.

DETAILED DESCRIPTION OF THE INVENTION

Figure 1:
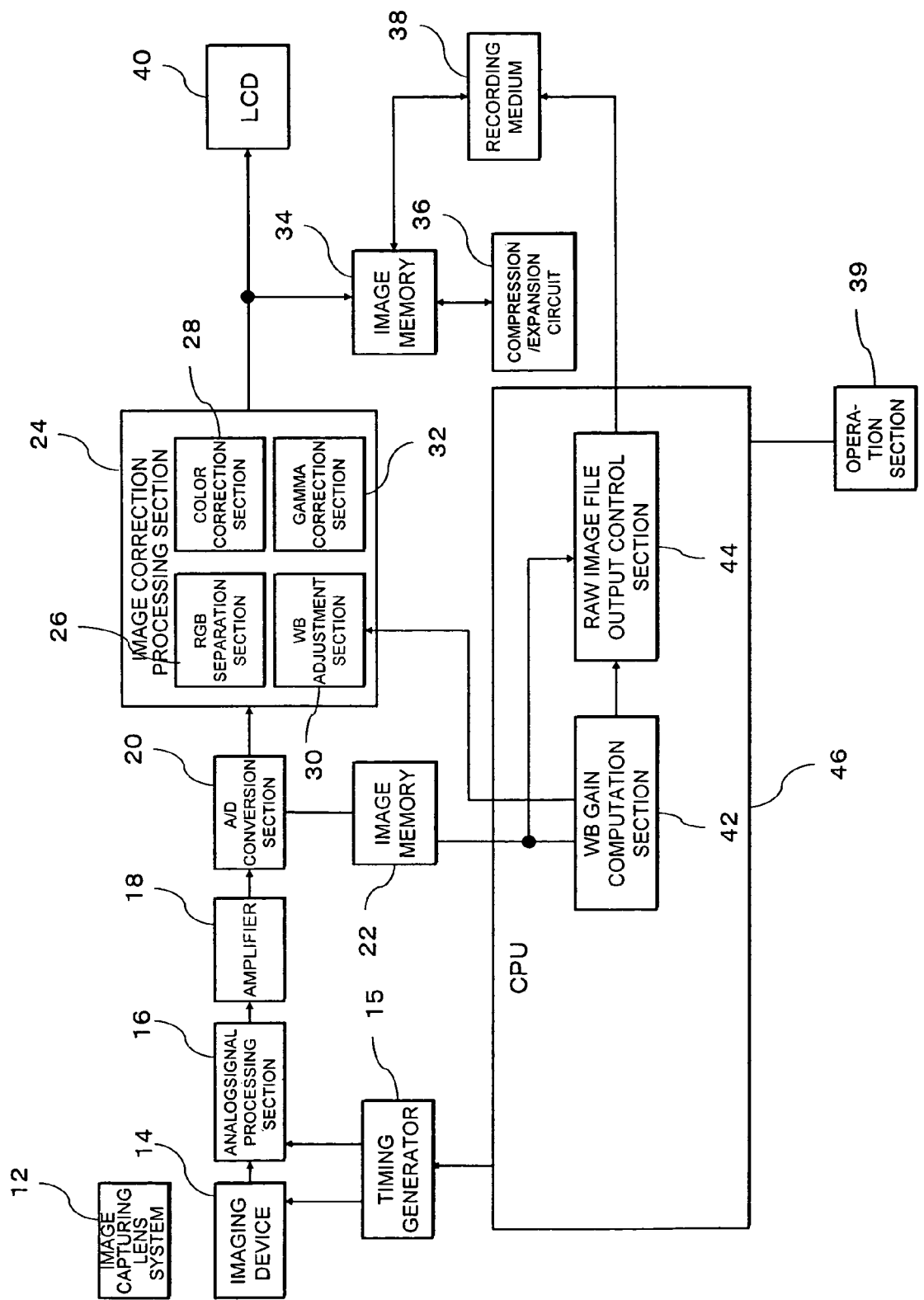
FIG. 1 is a block diagram showing a structure of a digital-camera according to a first embodiment of the present invention.

A first embodiment of the present invention will be described in detail with reference to the accompanying drawings. FIG. 1 is a block diagram showing a structure of a digital camera according to a first embodiment of the present invention. In this digital camera, for white balance setting, selection between a manual white balance setting in which the type of a light source is designated by a user and an auto white balance setting in which the type of a light source is automatically determined based on a captured image can be performed. Further, in addition to compressing a captured image which has been subjected to image correction and outputting the compressed image in a data form such as JPEG, the digital camera is also configured such that the captured image can be output in a RAW data form obtained by subjecting an output signal from an imaging device to A/D conversion. When outputting the image in the RAW data form, a plurality of types of white balance gains are recorded in an RAW image file. The digital camera will be described in detail below.

Light from a subject (hereinafter referred to as "subject light") input via an image capturing lens system 12 is focused on an imaging device 14 such as a CCD, thereby producing an image capturing signal. For generating the image capturing signal, a lens and an aperture forming the image capturing lens system 12 are controlled through a driving section. The imaging device 14 is driven upon operation of a release button (not shown) for outputting the image capturing signal. The timing of image capturing by the imaging device 14 is controlled by a timing generator 15.

The image capturing signal output from the imaging device 14 is subjected to analog signal processing by an analog signal processing section 16, and is then amplified by an amplifier 18. The amplified image capturing signal is further converted to a digital signal by an A/D conversion section 20 and is then temporarily stored in an image memory 22 in the form of RAW data.

In order to output a compressed image file, the RAW data stored in the image memory 22 is transmitted to an image correction processing section 24 where the RAW data is subjected to various image correction processing. More specifically, the RAW data is first separated into image data of R, G, and B by an RGB separation section 26. Further, a white balance adjusting section 30 (herein after white balance will be abbreviated as "WB") multiplies separated image data by WB gains for R, G, and B, respectively, to thereby perform WB adjustment. Here, the WB gains are computed by a WB gain computation section 42.

The WB gain computation section 42 computes a WB gain in accordance with a WB setting designated by a user at the time of image capturing. Specifically, at the time of image capturing, the user can designate either the auto white balance setting ("auto white balance" will be hereinafter abbreviated as "AWB") or the manual white balance setting ("manual white balance" will be hereinafter abbreviated as "MWB"). In the AWB setting, the camera automatically determines a light source and computes a WB gain which is suitable for the light source. Accordingly, when an image is captured with the AWB setting, the WB gain computation section 42, based on the RAW data, automatically determines a light source included in the RAW data and computes a WB gain in accordance with the light source which is determined. In the MWB setting, on the other hand, the light source is designated by the user. In this case, the user determines which of fluorescent light, daylight, and tungsten light the light source of the subject is, and designates the light source. The WB gain computation section 42 then computes a WB gain in accordance with the light source designated by the user. Selection of the WB setting as described above is performed by a user via an operation section 39 prior to image capturing.

Here, there are occasions where the WB gain computation section 42 computes a WB gain with the setting other than the WB setting designated by the user. Specifically, as will be described in detail below, when generating the RAW image file, the WB gain computation section 42 computes a WB gain in accordance with the WB setting designated by the user and also a WB gain in accordance with the setting other than WB setting designated by the user, and records these WB gains in the RAW image file. As such, the WB gain computation section 42 functions as first gain computing means and second gain computing means.

The image data which has been subjected to WB adjustment is further subjected to various image correction processes such as color correction and gamma correction, and is then temporarily stored in an image memory 34. An image compression and expansion circuit 36 captures the image data which is temporarily stored in the image memory 34 to subject the image data to a compression process. The image data which is thus compressed is recorded in a recording medium 38 as a compressed image file which conforms to a predetermined format such as JPEG. The compressed image file recorded in the recording medium 38 is expanded in the compression and expansion circuit 36, as required, and displayed on an LCD 40.

The compressed image file, which has been already subjected to an image correction process and is also in a general file format, can provide easy handling for a user. However, if the setting designated by the user at the time of image capturing is erroneous, the image correction process is preformed with an inappropriate setting. In this case, it is not possible to avoid deterioration of the image quality even by user's attempt to perform an image correction process once again, because the image has been already subjected to a compression process. Consequently, such a compressed image file is considered to be unsuitable in a case where the user attempts to perform further image correction with respect to the captured image.

In order to deal with the above difficulty, according to the present embodiment, it is also possible to output image data which has not been subjected to an image correction process or a compression process, i.e. an RAW image file containing RAW data. Such an RAW image file is a file of RAW data obtained immediately after A/D conversion, in other words, before the image correction process is performed. The user can perform a desired image correction process using the RAW data.

A WB gain is recorded, as supplementary information, in the header portion of the RAW image file. As described above, the WB gain is a parameter which is used for WB adjustment and is computed by the WB gain computation section 42. Because the WB gain is affected by individual differences among CCDs mounted in different cameras, it is difficult to obtain an appropriate WB gain value using an external image processing device. Further, if the WB gain is obtained by image processing performed externally to the camera, there arises a problem that additional time is required for the image processing external to the camera. For these reasons, the WB gain is necessarily recorded in the header of the RAW image file as supplementary information when the RAW image file is to be output. Here, the supplementary information includes, in addition to the WB gain, parameters for other image correction processes such as optical black correction data and gray level correction data, device information for specifying a camera, and image capturing condition information such as date of image capturing and the shutter speed.

An RAW image file output control section 44 controls output of the RAW image file including these supplementary information items. Specifically, the RAW image file output control section 44 combines the supplementary information such as the WB gain computed by the WB gain computation section 42 and the RAW data read out from the image memory 22 into a predetermined RAW image file form, which is then recorded in the recording medium 38.

Here, the WB gain which is recorded in the RAW image file is basically a WB gain in accordance with the WB setting designated at the time of image capturing. Accordingly, if the AWB setting is designated at the time of image capturing, the AWB gain is recorded. On the other hand, if the MWB setting is designated at the time of image capturing and a specific light source is designated by the user, the WB gain in accordance with the designated light source is recorded.

However, appropriate WB setting is not always performed at the time of image capturing. In particular, in the case of the MWB setting, as it is necessary for a user himself to discriminate and designate the light source, the user needs to have sufficient experience for discriminating light sources. Consequently, it has been likely that the light source will be designated erroneously in the MWB setting. Even if the light source is not designated erroneously, there is a demand for comparing the WB adjustment result in accordance with the designated light source with the results in accordance with a light source which is different from the designated light source or a light source discriminated in the AWB setting.

In order to meet the above demand, according to the present embodiment, when outputting the RAW image file, in addition to the WB gain obtained based on the WB setting designated at the time of image capturing, the WB gain obtained based on another WB setting is also stored automatically or in accordance with a user's designation, in the RAW image file. In particular, when an image is captured in the MWB setting, in addition to the WB gain obtained in accordance with the light source designated by the MWB setting, an AWB gain is also computed and recorded in the RAW image file. As described above, the AWB gain is computed in accordance with a light source which is automatically determined by the camera. Accordingly, the AWB gain is considered to be a WB gain for which a fixed quality can be assured without fail independently of the user's skill. In other words, the WB adjustment which satisfies a certain standard can always be assured as long as the AWB gain is recorded.

Consequently, even if the MWB setting is performed in an erroneous manner, it is possible to achieve WB adjustment using a WB gain obtained based on another WB setting (i.e. a WB gain obtained in accordance with another light source) by recording a plurality of WB gains in an RAW image file as described above. In addition, by adopting a structure in which the WB gain obtained based on the AWB setting is always recorded when an image is captured with the MWB setting, it is possible to prevent a problem resulting from erroneous designation of the light source which is likely to occur in the case of the MWB setting, thereby always allowing WB adjustment which satisfies a certain standard regardless of user's skill.

Here, in order to record a plurality of WB gains in an RAW image file, it is naturally necessary to compute the plurality of WB gains. A great number of techniques for computing a single WB gain have conventionally been proposed. If these techniques are directly used so as to compute a plurality of WB gains, it would take time which is a plurality of times the time required for computing a single WB gain. Therefore, according to the present embodiment, when computing a plurality of WB gains, a portion of the process for computing each of the plurality of WB gains is made in common, thereby achieving a reduction in time for computing the plurality of WB gains.

Figure 2:
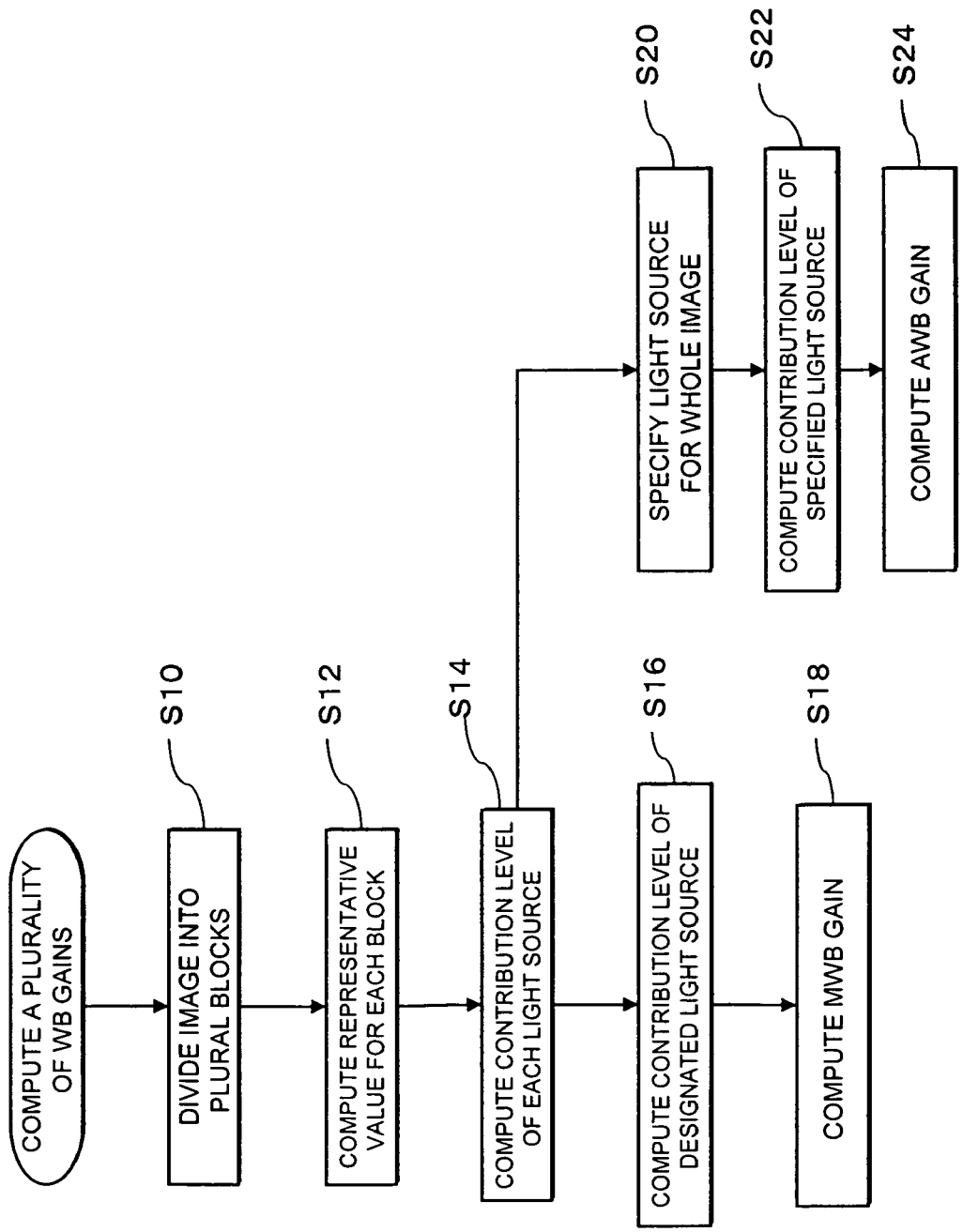
FIG. 2 is a flowchart showing a process flow for computing a plurality of WB gains according to the first embodiment.

FIG. 2 is a flowchart showing the most fundamental process flow when computing a plurality of WB gains, particularly when computing an AWB gain and an MWB gain, according to the present embodiment. When computing a plurality of WB gains, a whole image is first divided into a plurality of blocks (S10). Then, an average value of pixel values (RGB values) for all the pixels in each block is obtained as a representative value of each block (S12). Based on the representative value thus obtained, a contribution level of each light source (fluorescent light, daylight, tungsten light) to the whole image is obtained (S14).

A great number of methods for computing the contribution level have been conventionally proposed. In the most fundamental method among these methods, a light source is determined for each block, and the contribution level is determined based on the number of blocks for each type of light source. In this case, the light source for each block is first determined. The determination of light source is performed by comparing information of the white object color range which is predetermined for each light source and which indicates a color range of a white object under each corresponding light source with the representative value of each block.

Figure 3:
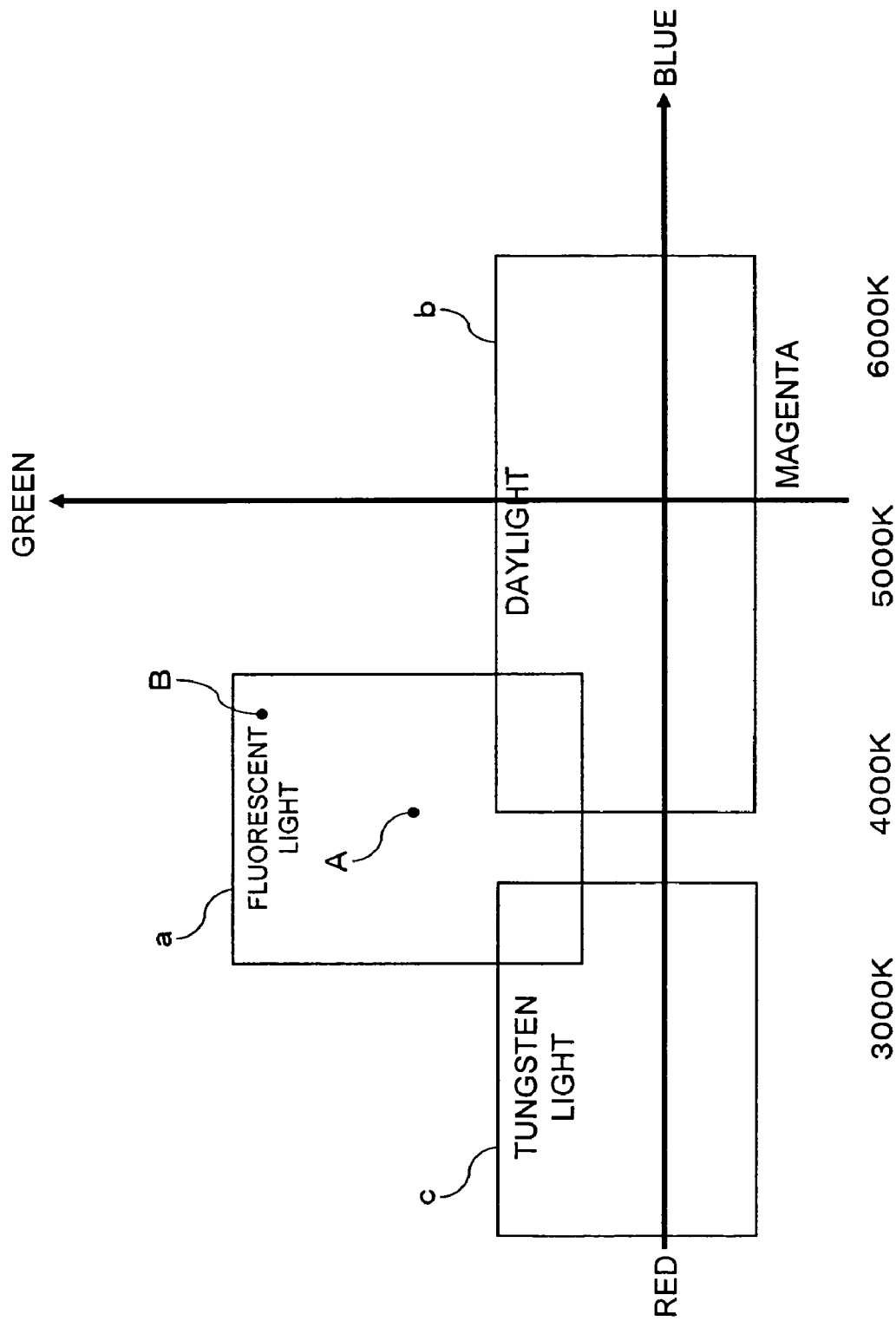
FIG. 3 is a diagram showing an example of color range information of a white object.

The determination of light source will be described with reference to FIG. 3. FIG. 3 is a view which expresses color ranges of a white object under fluorescent light, tungsten light, and daylight on a color space called "T-pace". The "T-pace" is a kind of color space in which the horizontal axis indicates red to blue (color temperature) and the vertical axis indicates magenta to green. A coordinate value on this T-space indicates a value of a specific color.

Referring to FIG. 3, a range enclosed by a solid line in the shape of a rectangle shows a range of color values of a white object under each light source. Specifically, the rectangle a shows a color range of a white object under fluorescent light, the rectangle b shows a color range of a white object under daylight, and the rectangle c shows a color range of a white object under tungsten light. Hereinafter, the range of color values for a white object under a certain light source will be referred to as a "white object color range". When determining the light source for each block as described above, the representative value of each block is converted into a coordinate system in this T-space to thereby determine within which white object color range of a light source type the coordinates are located. If the representative value of a certain block is located within the white object color range of any one of the light source types, the light source of that block is determined to be of the type. For example, if a representative value of a certain block is located at the position A in FIG. 3, the light source for the block is determined to be fluorescent light.

Once the light source for each block is obtained, then the number of blocks for which each light source is determined is counted. Specifically, the number of blocks for which the light source is determined to be tungsten light, the number of blocks for which the light source is determined to be daylight, and the number of blocks for which the light source is determined to be fluorescent light are counted. The result of this counting corresponds to a contribution level of each light source to the whole image.

Figure 4:
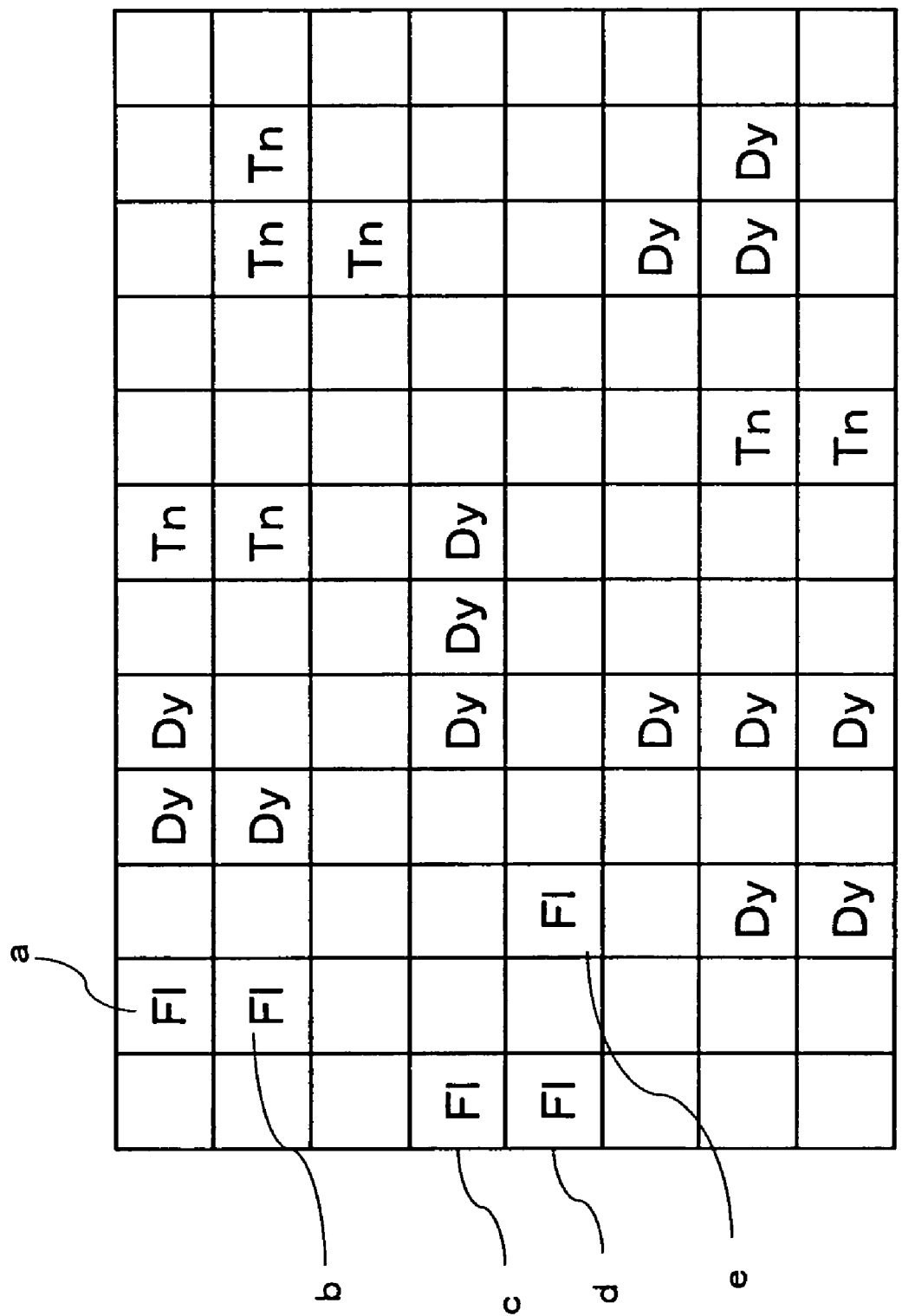
FIG. 4 is a diagram showing an example result of determination of light source for each block.

The determination of the contribution level will be described specifically with reference to FIG. 4. FIG. 4 is a view showing an example result of light source determination for each block when a certain image is divided into 12×8 blocks. In FIG. 4, a block labeled with "Fl" shows a block for which fluorescent light is determined to be the light source, a block labeled with "Dy" shows a block for which daylight is determined to be the light source, and a block labeled with "Tn" shows a block for which tungsten light is determined to be the light source. In the example shown in FIG. 4, the number of blocks for which fluorescent light is determined to be the light source is five, the number of blocks for which daylight is determined to be the light source is fourteen, and the number of blocks for which tungsten is determined to be the light source is seven. Consequently, the ratio of the contribution levels for the respective light source types is as follows; fluorescent light:daylight:tungsten light=5:14:7.

It should be noted that the method of computing the contribution level as described above is the most fundamental one. Accordingly, any other contribution level computing methods may be used in order to obtain more strict contribution level. For example, the reliability of the light source determination result may be obtained and used as a weighting factor.

Once the contribution level of each light source is obtained, then MWB gain computation and AWB gain computation is performed. When computing the MWB gain, the contribution level of the light source designated by a user to the whole image is computed (S16). If the fluorescent light is designated as a light source in the MWB setting, for example, the contribution level of the fluorescent light to the whole image is obtained. The contribution level of the designated light source may be computed anew or may be obtained using the value computed at step S14. Once the contribution level of the designated light source is obtained, the MWB gain which is adjusted in accordance with the contribution level is computed (S18). With regard to computation of the MWB gain in accordance with the contribution level, a great number of methods have been conventionally proposed, and these computation methods may be used to compute the MWB gain.

On the other hand, when computing the AWB gain, a light source for the whole image is specified after computation of the contribution level of each light source (S20). Specifically, the light source for each block has been determined at step S14, and now the light source type which can be determined to be a light source for the whole image is specified at step S20. The light source for the whole image basically corresponds to the light source which has the highest contribution level which is computed at step S14. Accordingly, in the example shown in FIG. 4, "daylight" is determined to be the light source type for the whole image. It is of course possible to use various correction values and computation methods which have been conventionally proposed for specifying the light source for the whole image.

When the light source for the whole image is specified, then the contribution level of the light source which is thus specified to the whole image is obtained (S22). Such a contribution level may be computed using the contribution level obtained at step S14 or may be computed anew. Then, the AWB gain which is adjusted in accordance with the contribution level of the light source which is obtained (S24).

Computation of a plurality of WB gains is performed according to the process flow described above. As is clear from the above description, in the present embodiment, the process flow from the step of dividing of an image into blocks (S10) through the step of computing the contribution level of each light source (S14) is performed in common for both the MBW gain computation and the AWB gain computation. It is therefore possible to compute two types of WB gains in a relatively short time.

In particular, in order to compute the representative value for each block (S12), it is necessary to add the pixel values of all the pixels in the corresponding block. In other words, it is necessary to perform the calculation operation at least a number of times corresponding to the number of pixels. This makes the computation process of the representative value for each block relatively time-consuming. On the other hand, the various processes to be performed after computation of the contribution value of each light source (S14) require a relatively short time because these processes are performed for each block and require a reduced number of calculation operations. The time required for the processes up to the computation of the contribution level of each light source (S14) is several hundred msec, whereas the time required for the processes after that process at step S14 is only approximately 1 msec, though it depends on the processing ability of a camera and the number of divided blocks. As described above, in the present embodiment, the computation process of the representative value for each block which is the most time-consuming process in the WB gain computation is performed only once, and the representative value which is thus computed by the one-time calculation process is used for both the AWB gain computation and the MWB gain computation. As a result, the time required for a plurality of WB gains can be significantly reduced. Therefore, when recording a plurality of WB gains in a single RAW image file, only a short time is required for the process. Consequently, appropriate WB adjustment can be achieved even if the WB setting at the time of image capturing has been performed erroneously.

While, in the above example, the AWB gain and the MWB gain are computed, other combinations of gains may be used. For example, the process flow of the present embodiment may be used for computing the MWB gain when fluorescent light is the designated light source and the MWB gain when daylight is the designated light source. Further, while in the above example, only two WB gains are computed, it is of course possible to use the process of the present embodiment for computing a greater number of WB gains. Also, while the WB gains to be recorded in a RAW image file are computed in the above example, naturally, WB gains can also be computed for other purposes.

Figure 5:
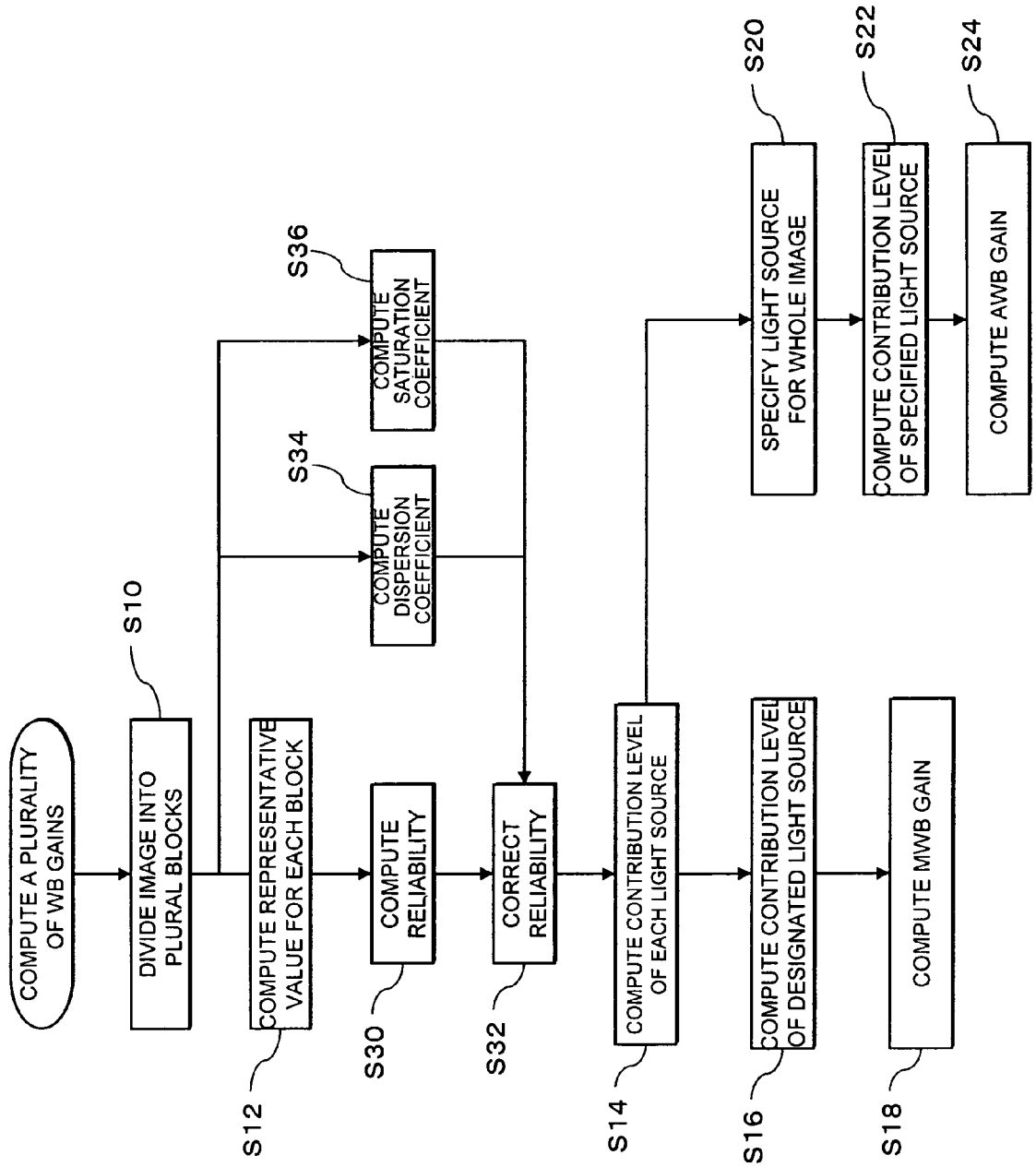
FIG. 5 is a flowchart showing a process flow for computing a plurality of WB gains according to the second embodiment.

The second embodiment of the present invention will be described. The overall structure of a digital camera according to the second embodiment is similar to that in the first embodiment, and will therefore not be described again. In the following, the flow of computing a plurality of WB gains according to the second embodiment will be particularly described. FIG. 5 is a flowchart showing a flow of computing a plurality of WB gains in the second embodiment. With this computation method, reliability of the light source determination result for each block and correction factors of the reliability are computed, so that more appropriate WB gains can be obtained.

In this embodiment, as in the first embodiment, an image is first divided into a plurality of blocks (S10) and the representative value is computed for each block (S12). Further, in parallel with the computation of the representative value, a dispersion coefficient and a saturation coefficient are computed (S34 and S36). Specifically, the dispersion coefficient is computed based on a variance of pixel values within a single block. The dispersion coefficient is computed such that the greater the dispersion, the smaller the dispersion coefficient. The saturation coefficient is determined in accordance with the number of saturated pixels in one block. Here, a saturated pixel refers to a pixel including one or more components (e.g. R, G or B) of pixel values reaching the upper limit value (which is "255" when expressed in 8-bit form). The WB gain computation section counts the number of saturated pixels in a block and obtains the saturation coefficient based on the counted result. For the saturation coefficient, a coefficient which satisfies the relationship that the greater the number of saturated pixels, the smaller the corresponding saturation coefficient, is used. The dispersion coefficient and the saturation coefficient thus obtained are to be used as correction values for the reliability which will be described in further detail below.

Once the computation of the representative value is completed, the light source of each block is determined based on the representative value, and also reliability of the light source determination is computed (S30). The light source for each block is determined in the same manner as in the first embodiment. Specifically, the white object color range information provided for each light source type and the representative value of each block are compared, to thereby determine within which white object color range the representative value of each block is included.

The reliability is a parameter indicating to what degree the determination result of the light source type can be relied on. Specifically, the reliability is obtained based on the distance between the representative value and a reference value under each light source. For example, assuming that the point A is a reference value, the reliability of the block whose representative value is the point B is obtained based on the distance AB. The smaller the distance, the higher the reliability, and the greater the distance, the lower the reliability. As the reliability can be computed using various known techniques, the detailed method of computing the reliability will not be described.

Subsequently, the reliability thus obtained is further corrected (S32). Correction of the reliability is achieved by multiplying the reliability obtained at step S30 by the dispersion coefficient and the saturation coefficient obtained by steps S34 and S36, respectively. Thus, more accurate reliability can be obtained.

Once the reliability which has been corrected is obtained, then the contribution level of each light source is computed (S14). As in the first embodiment, the contribution level of each light source is computed based on the number of blocks for each light source type. In this embodiment, however, the reliability obtained at steps S30 and S32 is used when computing the contribution level. More specifically, the number of blocks for each light source type is multiplied by the reliability to obtain the contribution level with respect to the whole image. As the contribution level is computed taking into consideration the reliability, more accurate contribution level can be obtained.

In the example of FIG. 4, for example, the number of blocks for fluorescent light is five, the number of blocks for daylight is fourteen, and the number of blocks for tungsten light is seven. However, as some of the blocks for which "fluorescent light", for example, is determined to the light source may have low reliability, it is not possible to obtain an accurate contribution level for each light source if each of these blocks with low reliability is counted as "one block" in the same manner as the block with high reliability. Accordingly, in the present embodiment, when counting the number of blocks, i.e. computing the contribution level, the reliability of each block is also multiplied for each light source type. For example, assuming that reliabilities of the blocks a, b, c, d, and e in FIG. 4 are 1, 1, 0.5, 0.5, and 0.3, the number of blocks (the contribution level) for the light source of fluorescent light would be 2×1+2×0.5+1×0.3=3.3. With regard to the number of blocks for daylight and tungsten light, a product of the number of blocks and the reliability is similarly computed as the contribution level.

When the contribution level is obtained, each of the MWB gain and the AWB gain is then computed in the same manner as in the first embodiment (S16 to S24). However, while the contribution level of the light source designated by the user, the light source for the whole image, or the like are specified based on only the number of blocks for each light source type in the first embodiment, the contribution level and the light source for the whole image are computed based on the value obtained by multiplying the number of blocks by the reliability in the second embodiment. Further, when computing the final MWB gain (S18) and AWB gain (S24), the gain values are similarly computed taking into consideration the reliability. More specifically, a weighted average value of the representative values of the blocks for which the light source is determined to be the user designated light source or the blocks for which the light source for the whole image is specified and the reliabilities is obtained, and each WB gain is computed based on the weighted average value.

As is clear from the above description, in the second embodiment, as in the first embodiment, it is possible to reduce the time required for computing a plurality of WB gains because a portion of the MWB computing process and a portion of the AWB computing process are common. In particular, because the computation of the representative value (S12), the computation of the dispersion coefficient (S34), and the computation of the saturation coefficient (S36), which are time-consuming calculation processes performed for each pixel, are performed in common, the time required for computing a plurality of WB gains can be reduced significantly. Here, the time required for the process after the computation of the contribution level (S14) in the second embodiment is approximately 1 msec.

Figure 6:
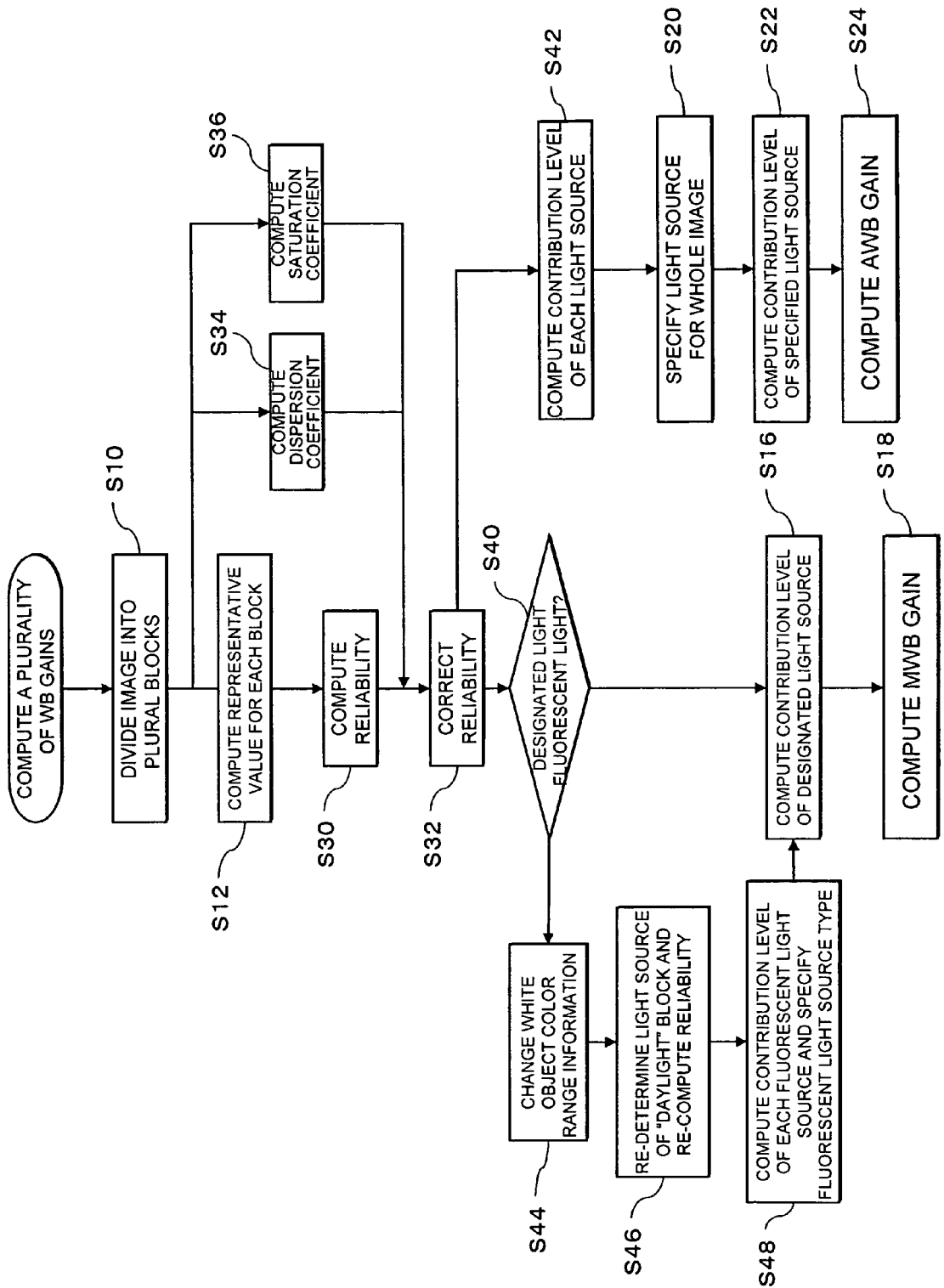
FIG. 6 is a flowchart showing a process flow for computing a plurality of WB gains according to the third embodiment.

The third embodiment of the present invention will be described. The overall structure of a digital camera according to the third embodiment is also similar to that in the first embodiment, and will therefore not be described again. In the following, the flow of computing a plurality of WB gains according to the third embodiment will be particularly described. FIG. 6 is a flowchart showing a flow of computing a plurality of WB gains in the third embodiment. This embodiment is particularly effective when "fluorescent light" is designated as the light source type in the MWB setting. When "fluorescent light" is designated by a user in the MWB setting, normally, a WB gain in accordance with the color of the fluorescent light is computed. However, there are various kinds of lighting apparatuses which are generally called "fluorescent lamps", and the color temperature of light emitted from a "fluorescent lamp" varies depending on the type.

Currently, there are four types of fluorescent lamps available in the market: a cool white fluorescent lamp, a neutral white fluorescent lamp, a daylight fluorescent lamp, and a warm white fluorescent lamp. Cool white fluorescent lamps are widely used for business and are rarely used for household use. Neutral white fluorescent lamps are widely used in general households and generate light having a color temperature corresponding to daytime white light (approximately 5500K). Daylight fluorescent lamps are also used widely in households and generate light having a color temperature corresponding to daylight (approximately 6500K). Warm white fluorescent lamps generate light having a color temperature which is close to that of tungsten light.

Of the four types of fluorescent lights, the warm white fluorescent light, which has a color clearly different from colors of other types of fluorescent lights, will not be recognized by a user as a "fluorescent color". On the other hand, because the remaining three types of fluorescent lights, i.e. cool white fluorescent light, neutral white fluorescent light, and daylight fluorescent light, have colors which are relatively similar to each other, it is difficult for a user to distinguish the colors from each other. It is therefore easy to expect the user to select "fluorescent light" as a light source in the MBW setting when the light source for image capturing is one of cool white fluorescent light, neutral white fluorescent light, and daylight fluorescent light.

Figure 7:
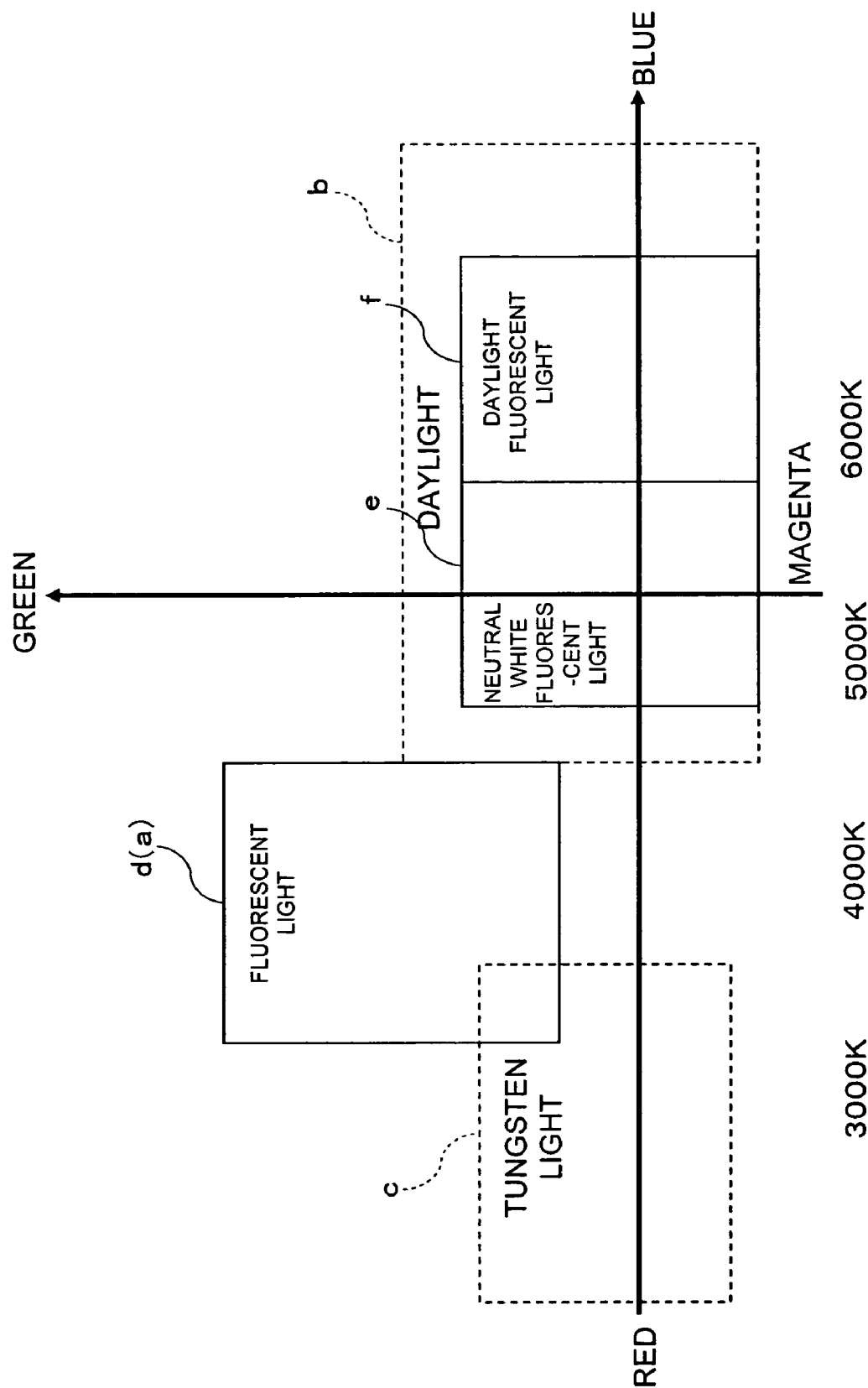
FIG. 7 is a diagram showing example color range information of a white object which is used in the third embodiment.

However, the color ranges of these three types of fluorescent lights actually differ from each other to a great extent. FIG. 7 shows the color ranges of a white object under the three types of fluorescent lamps. In FIG. 7, as in FIG. 3, the color range of a white object under each light source is represented on a color space called T-space. In FIG. 7, rectangles enclosed by solid lines show a color range d of a white object under cool white fluorescent light, a color range e of a white object under neutral white fluorescent light, and a color range f of a white object under daylight fluorescent light, respectively. The color ranges of a white object under the typical light sources shown in FIG. 3 are also shown by rectangles enclosed by dot lines. It should be noted that the color range a of a white object under fluorescent light coincides completely with the color range d of a white object under cool white fluorescent light.

As clearly shown in FIG. 7, the white object color ranges under the three types of fluorescent lights differ significantly from each other. In particular, the white object color ranges e and f under the neutral white fluorescent light and the daylight fluorescent light are included in the white object color range b under "daylight", not in the white object color range a under general "fluorescent light". Accordingly, if "fluorescent light" is selected as a light source in the MWB setting at the time of image capturing under neutral white fluorescent light or daylight fluorescent light, appropriate gains cannot be obtained, resulting in a problem that WB adjustment cannot be performed appropriately.

To deal with the above problem, according to the third embodiment, when "fluorescent light" is selected as a light source in the MWB setting, the type of the selected fluorescent light is automatically discriminated. The specific flow of the process of determining the type of fluorescent light will be described with reference to FIG. 6.

When "fluorescent light" is designated as a light source type in the MWB setting and image capturing is performed, the WB gain computation section 42 computes both an MWB gain and an AWB gain. In this case, the image is first divided into a plurality of blocks (S10), and then the representative value of each block and the reliability of each block are computed and corrected (S30 and S32). This process flow is the same as that in the second embodiment. Here, the information shown in FIG. 3 is used as the information concerning the white object color ranges when computing and correcting the reliability. More specifically, the white object color range information concerning only the three types of light sources, i.e. fluorescent light, daylight, and tungsten light, is used.

Subsequently, for computing the MWB gain, the light source type designated by the user is determined (S40). If the light source type designated by the user is not "fluorescent light", the MWB gain is computed according to the same process flow as in the second embodiment. Specifically, the contribution level of the designated light source to the whole image is computed based on the representative value and the reliability of each block which are obtained (S16), and the MWB gain in accordance with the contribution level of the designated light source is computed (S18).

On the other hand, if the light source type designated by the user is "fluorescent light", the white object color range information is replaced by that shown in FIG. 7 (S44). Specifically, the white object color range information is changed to the information in which, in addition to the white object color ranges under fluorescent light, daylight, and tungsten light, the white object color ranges under cool white fluorescent light, neutral white fluorescent light, and daylight fluorescent light are recorded.

Then, based on the new white object color range information, the light source type and the reliability are computed once again concerning blocks for which the light source has been determined to be "daylight" (S46). Specifically, at this point in time, the light source type has been determined and the reliability has been computed based on the white object color range shown in FIG. 3 (S30 and S32). Consequently, at this point in time, with regard to the blocks which fall within the white object color ranges e and f under the neutral white fluorescent light and the daylight fluorescent light, respectively, the light source has been simply determined to be "daylight". Accordingly, with regard to such blocks for which the light source has been determined to be "daylight", determination of a light source and computation of the reliability is performed once again based on their representative values and the white object color range information shown in FIG. 7.

Figure 8:
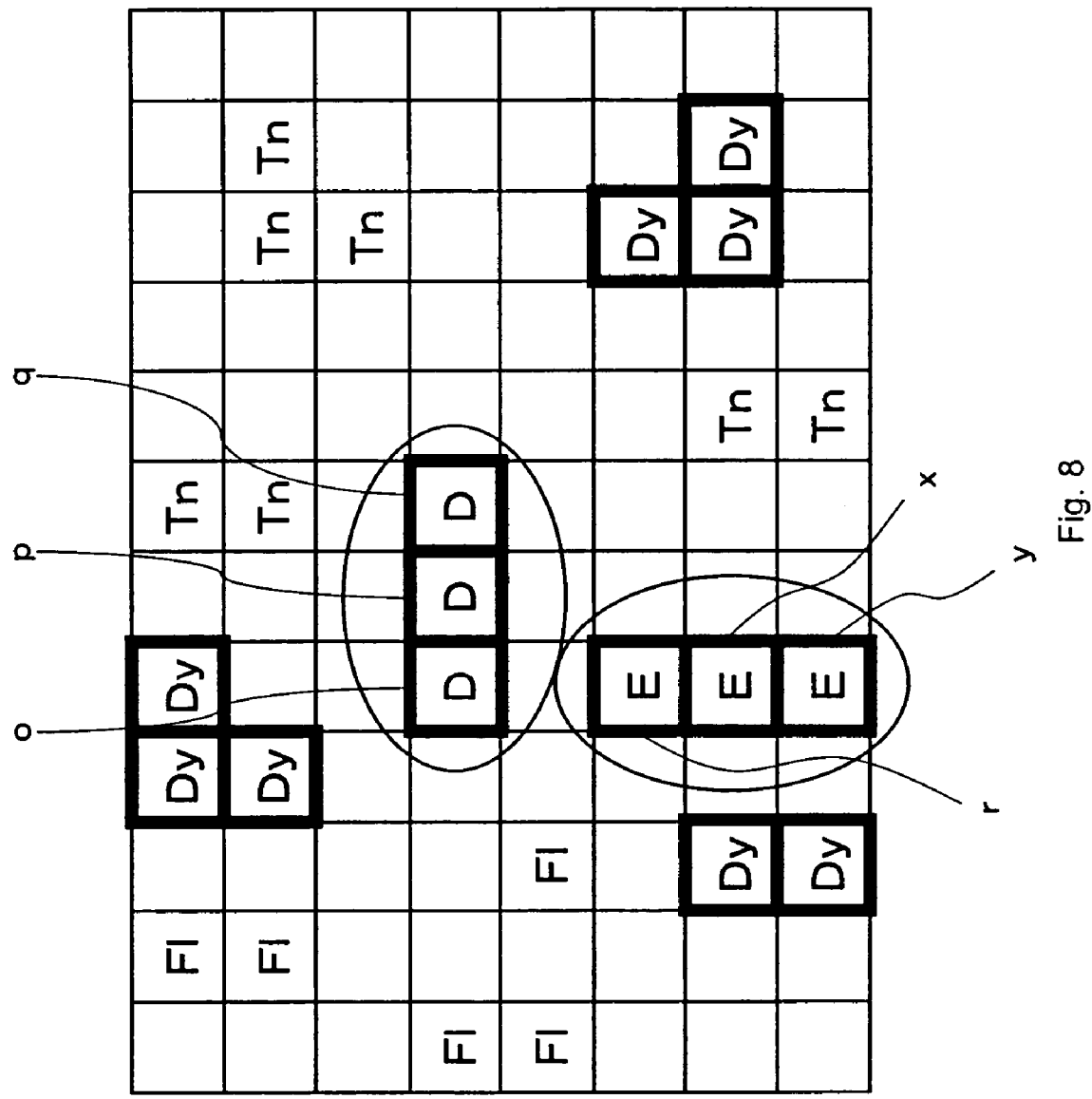
FIG. 8 is a diagram showing an example result of determination of light source for each block which is used in the third embodiment.

It is assumed, for example, that in the light source determination step (S30) and the reliability computation step (S32), the light source of each block has been determined as in the example shown in FIG. 4. In this case, at step S46, the light source is determined once again with regard to the fourteen blocks for which the light source has been determined to be "daylight", i.e. the blocks which are enclosed by bold lines in FIG. 8. FIG. 8 shows a case in which, as a result of re-determination of the light source type, neutral white fluorescent light (D) is determined for blocks o, p, and q and daylight fluorescent light is determined for blocks r, x, and y. Then, with regard to the blocks o, p, q, r, x, and y, the reliability is newly computed.

Then, based on the light source types and reliabilities which are thus newly obtained, the contribution level of each fluorescent light source to the whole image is computed (S48). Specifically, with regard to each of the three types of fluorescent light sources, i.e. cool white fluorescent light, daywhile fluorescent light, and daylight fluorescent light, a product value of the number of blocks and the reliability is computed as the contribution level. Subsequently, the process is performed according to the same flow as that of the normal MWB gain computation. More specifically, the contribution level of the specified fluorescent light source to the whole image is computed (S16) and the MWB gain in accordance with the contribution level thus computed is further computed (S18).

For example, in the example shown in FIG. 8, the number of blocks (F1) for which the light source is determined to be cool white fluorescent light is five, the number of blocks (D) for which the light source is determined to be neutral white fluorescent light is three, and the number of blocks (E) for which the light source is determined to be daylight fluorescent light is three. Now, assuming the reliability for all these blocks is assumed to be 1 for convenience of explanation, then in the example shown in FIG. 8, the cool white fluorescent light for which the number of blocks is the greatest is determined to have the highest contribution level. In this case, the cool white fluorescent light is determined to be a light source type designated by the user, and the MWB gain in accordance with the contribution level is computed.

Here, in parallel with the computation process of the MWB gain, the AWB gain is also computed. Specifically, once the reliability of each block is computed, the contribution level of each light source is computed (S42), and the light source for the whole image is specified (S20). Then, the AWB gain in accordance with the contribution level of the light source which has been specified is computed (S22 and S24).

As is clearly known from the above description, according to the third embodiment, an MWB gain can be computed in accordance with the type of fluorescent light. Here, because each of the process of determining the light source of the blocks and the process of computing the reliability is performed twice (S30 and S46) in this embodiment, it may seem that a longer time is required for calculation than in the first and second embodiment. However, these processes of determining the light source and computing the reliability are performed based on block units, not on pixel units, and can therefore be performed in an extremely short time. In the meantime, the processes of computing the representative value, the dispersion coefficient, and the saturation coefficient (S12, S34, and S36) which are performed based on the pixel units, in other words, time-consuming processes, are performed only once. Accordingly, there is only a little difference between the time required for calculation in the third embodiment and the time required for calculation in the second embodiment. Stated differently, in the third embodiment, it is similarly possible to compute two types of WB gains in a short time.

Figure 9:
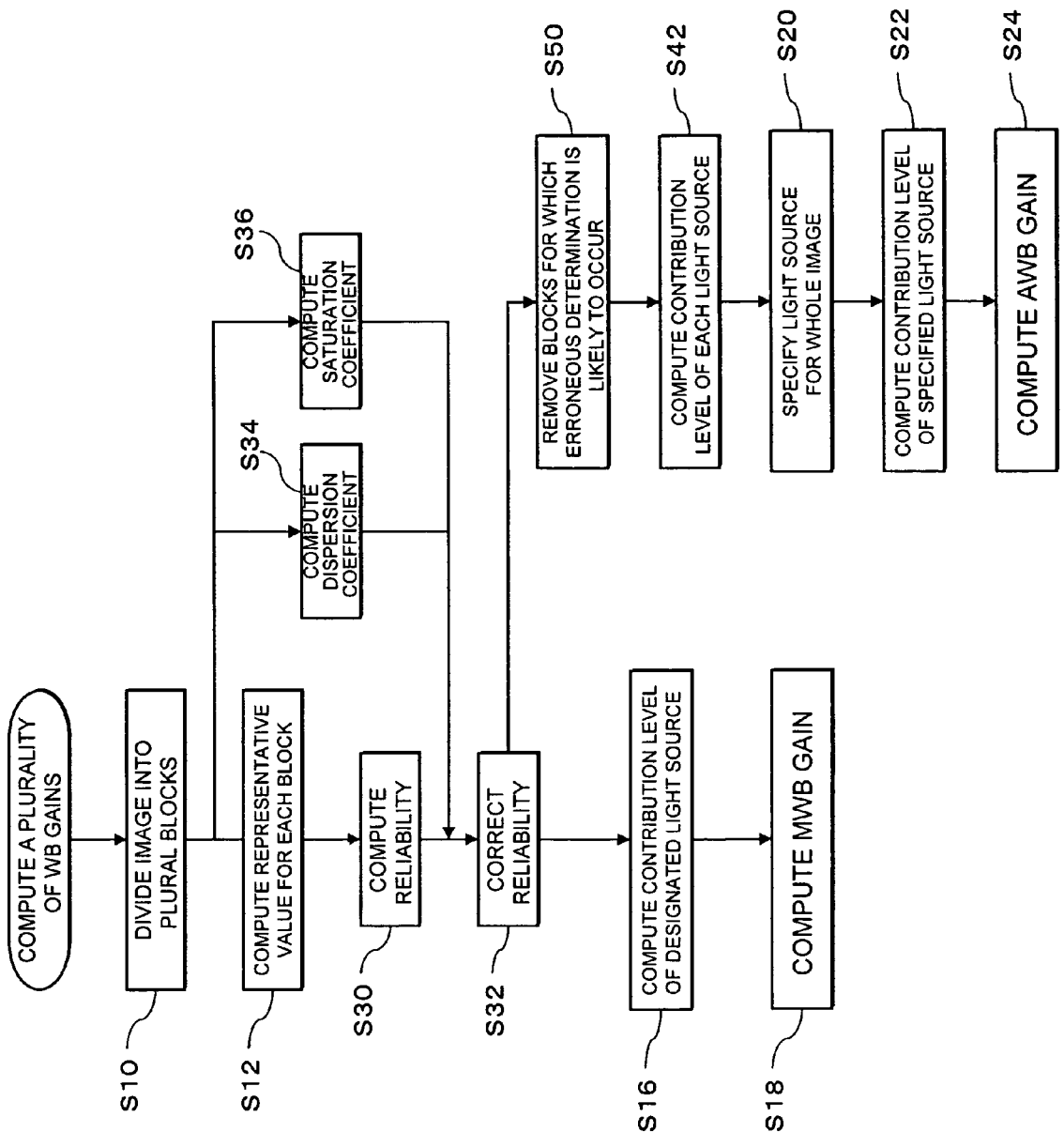
FIG. 9 is a flowchart showing a process flow for computing a plurality of WB gains according to the fourth embodiment.

The fourth embodiment of the present invention will be described with reference to FIG. 9. FIG. 9 is a flowchart showing a process flow for computing a plurality of WB gains in the fourth embodiment. According to the fourth embodiment, the accuracy in automatically determining the light source in the AWB gain computation can be further increased.

In the AWB setting, the light source is automatically determined by a camera and a WB gain in accordance with the light source thus determined is computed, as described above. Accordingly, WB gains which satisfy a certain level of reliability can basically be obtained. However, there are instances where this automatic determination of light source is difficult, depending on the color of a subject. More specifically, a green object under daylight assumes a color which is similar to a white object under fluorescent light. Further, an object of skin color under daylight assumes a color which is similar to a white object under tungsten light. In addition, an object of sky blue under fluorescent light assumes a color which is similar to a white object under daylight. As such, when a subject is a colored object which would assume a color of a white object under other light sources, there is a possibility that a light source will be erroneously determined.

Figure 10:
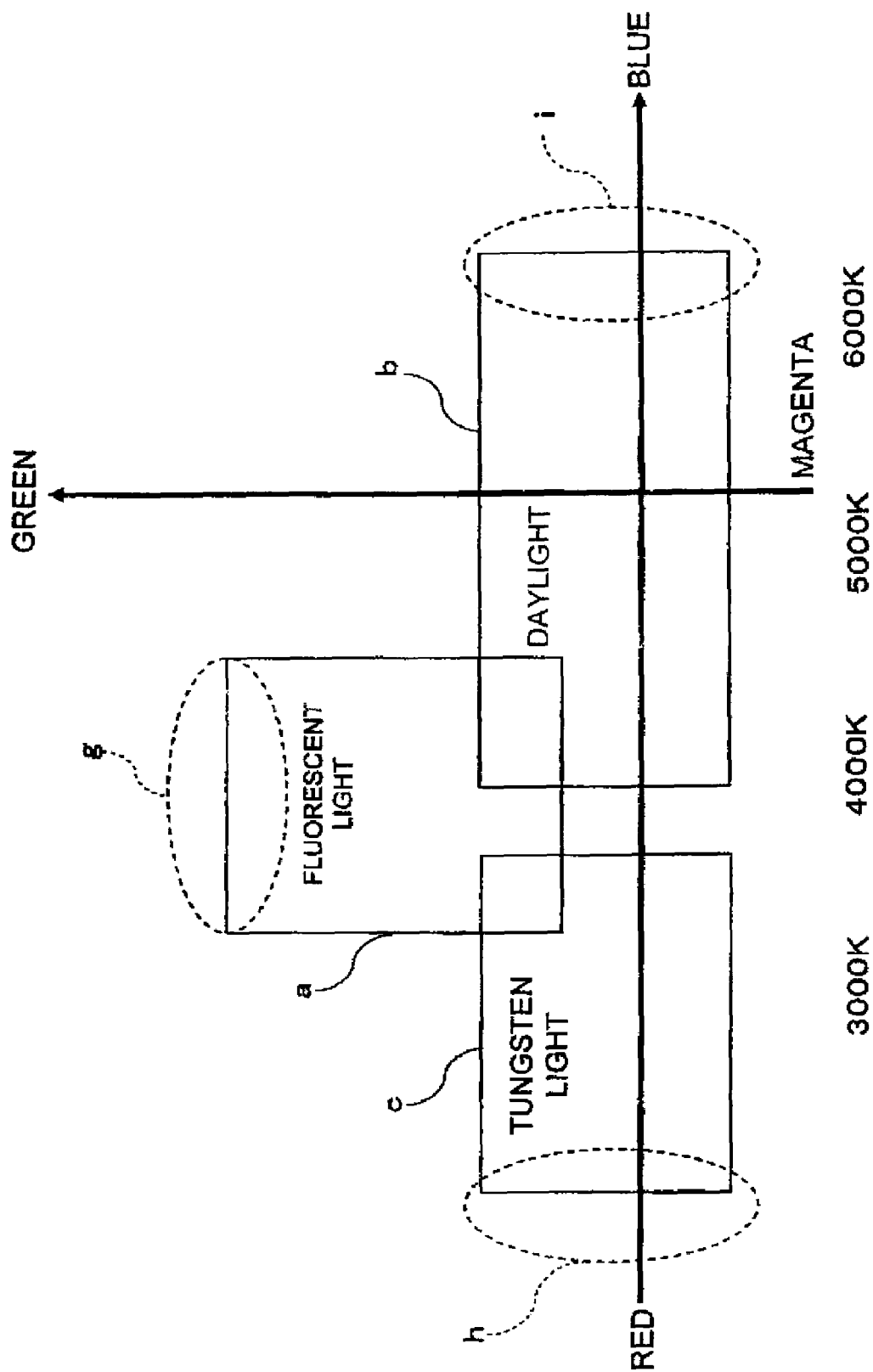
FIG. 10 is a diagram showing an example color range information of a white object and color ranges for which erroneous determination of light source is likely to occur, which are used in the third embodiment.

Such an erroneous determination of light source as described above will be described with reference to FIG. 10, which shows a white object color range under each light source type. In FIG. 10, the rectangles enclosed by solid lines represent white object color ranges under general light sources. Further, ellipses enclosed by dotted lines represent ranges for which an error in light source determination is likely to occur, in other words, color ranges which are similar to color ranges of a colored object under other light sources. More specifically, the color range g is similar to the color range of a green object under daylight, the color range h is similar to the color range of a skin color object under daylight, and the color range i is similar to the color range of a sky blue object under fluorescent light.

As clearly shown in FIG. 10, the white object color range under each light source type partially overlaps the color range of a colored object under another light source. Therefore, an error may be caused in determining the light source if a captured image includes a colored object. A case where an image of a green object is captured under daylight is considered, for example. When the captured image is divided into a plurality of blocks, naturally, a great number of blocks include the color of the green object. As the representative value of each of these blocks falls within the color range g in FIG. 10, the light source for each of these blocks is determined to be fluorescent light. This results in an increase in the number of blocks for which the light source is determined to be fluorescent light, which may further cause an error of designating "fluorescent light" as the light source at the time of image capturing, although the original light source at the time of image capturing is daylight.

According to the fourth embodiment, in the AWB gain computation, blocks having the representative values which fall within the color ranges g to i are removed in advance. Such a process flow will be described with reference to FIG. 9.

In the fourth embodiment, as in the second embodiment, when computing a plurality of WB gains, an image is first divided into a plurality of blocks (S10), and the representative value for each block is computed (S12). Further, based on the representative value thus obtained, the reliability is computed and corrected (S30 and S32). After computation and correction of the reliability, each of the MWB gain and the AWB gain is computed. The MWB gain is computed according to the same process flow as that in the second embodiment (S16 and S18).

When computing the AWB gain, on the other hand, blocks for which an error in determining the light source is likely to occur are first specified and removed (S50). Specifically, the representative value of each block which has been computed is compared with the white object color range information shown in FIG. 10. Then, the blocks whose representative value falls within the color ranges g to i for which erroneous determination is likely to occur are specified. As the blocks which are specified may be of a colored object under another light source, these blocks are flagged as removed blocks which will not be subjected to the subsequent processing.

Figure 11:
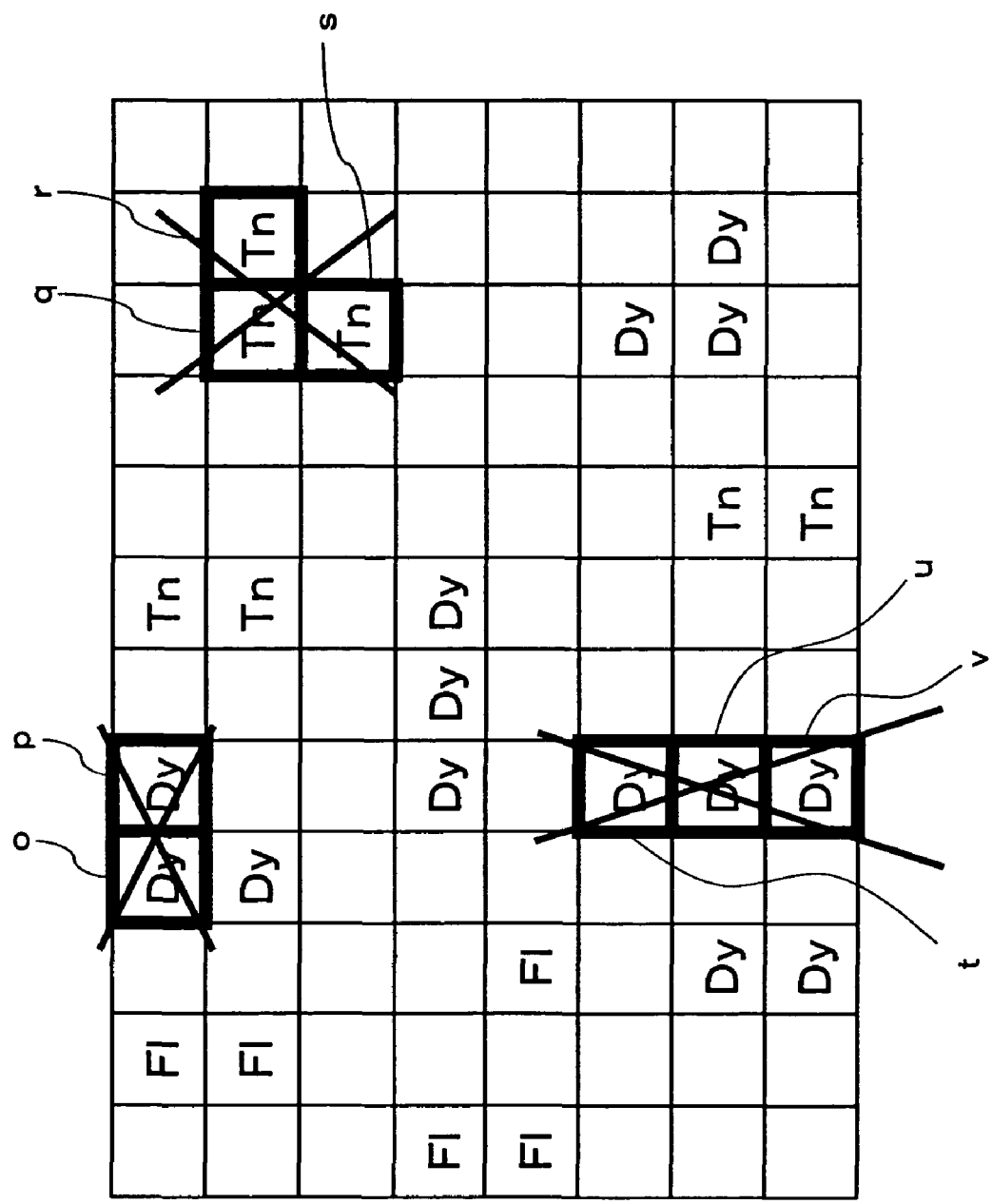
FIG. 11 is a diagram showing an example result of determination of light source for each block which is used in the fourth embodiment.

For example, in a case where the light source type of each block has been determined as shown in FIG. 11, if the representative values of the blocks o, p, t, u, and v fall within the color range i and the representative values of the blocks q, r, and s fall within the color range h, these blocks o to v are flagged as removed blocks.

Subsequently, the contribution level of each light source is computed (S42). When computing the contribution level, the blocks which have been specified as removed blocks are not used. In other words, with regard to the blocks other than these removed blocks, a product value of the representative value and the reliability is obtained for each light source type. Then, the light source having the highest product value is specified as the light source for the whole image (S20). Once the light source for the whole image is specified, the AWB gain in accordance with the specified light source is computed, and the process is terminated (S22 and S24).

Assuming that the reliabilities for all the blocks are 1 for the convenience of explanation, in the example shown in FIG. 11, the contribution level of daylight is 9, which is obtained from the number of blocks other than the removed blocks o, p, t, u, and v. The contribution level of tungsten light is 4, which is obtained from the number of blocks other than the removed blocks q, r, and s. The contribution level of fluorescent light is 5, because no blocks have been removed. Consequently, as the contribution level of daylight is the highest, the AWB gain in accordance with daylight is computed.

As clearly known from the above description, when computing AWB gains, the color ranges for which an error in determining the light source is likely to occur are disregarded. Consequently, the possibility of erroneous determination of light source can be decreased, so that more accurate AWB gains can be obtained. Further, in the fourth embodiment, as in the foregoing embodiments, the calculating operations performed for each pixel, i.e. the time-consuming calculation operations, are performed only once. It is therefore possible to significantly reduce the time required for computing two types of WB gains.

As described above, the time required for computing a plurality of WB gains can be significantly shortened by any of the embodiments of the present application. While in all the first to fourth embodiments, the MWB gain and the AWB gain are computed, the present invention may of course be applicable to the case where a plurality of MWB gains are computed. For example, the present invention is applicable to the case where the MWB gain in accordance with "fluorescent light" which is a designated light source and the MWB gain in accordance with "daylight" which is a designated light source are computed. Further, while in all the first to fourth embodiments, two types of WB gains are computed, the present invention is also applicable to the case where a greater number of types of WB gains are computed. For example, the present invention is applicable to the case where three types of WB gains, i.e. the AWB gain, the MWB gain in accordance with "fluorescent light" which is a designated light source, and the MWB gain in accordance with "daylight" which is a designated light source are computed. Further, the method of computing a WB gain in each of the above embodiments has been described only for the purpose of illustration, and may be changed as necessary as long as the calculation processes performed for each pixel are performed in common among a plurality of WB gain computation processes.

The present application also discloses a camera in which a white balance gain in accordance with a light source type designated by a user is computed, comprising determination means for determining whether or not the light source type designated by the user is fluorescent light, fluorescent light type discrimination means for discriminating the type of the fluorescent light which was used as a light source at the time of actual image capturing based on image data if the light source type designated by the user is determined to be fluorescent light, and computation means for computing a manual white balance gain using the fluorescent light type which has been discriminated by the fluorescent light type discrimination means as the light source type designated by the user.

The present application further discloses a camera which outputs RAW data obtained by digitizing an image capturing signal obtained by imaging means in the form of an RAW image file, comprising RAW image file output means for outputting RAW data obtained by digitizing an image capturing signal obtained by imaging means in the form of an RAW image file, gain computation means for computing a white balance gain for use in white balance adjustment, and determination means for determining whether or not a light source type has been designated by a user as white balance setting, wherein, if it is determined by the determination means that a light source type has been designated by the user, the gain computation means computes a manual white balance gain in accordance with the light source type designated by the user and an auto white balance gain in accordance with a light source type at the time of image capturing which is specified based on the RAW data, and the RAW image file output means records the manual white balance gain and the auto white balance gain which are computed in a header of the RAW image file and outputs the manual white balance gain and the auto white balance gain.

While the preferred embodiments of the present invention have been described using specific terms, such description is for illustrative purposes only, and it is to be understood that changes and variations may be made without departing from the spirit or scope of the appended claims.

What is claimed is:

1. A digital camera in which at least two types of white balance gains are computed with regard to a single image data item captured by the digital camera, the digital camera comprising:
   first gain computation means for computing from the captured image data, as a first gain, a white balance gain in accordance with a first light source condition designated by the user, wherein fluorescent light is designated by a user as the first light source condition and the first gain computation means includes:
   fluorescent type determination means for determining a type of fluorescent light which was used as a light source when an image was actually captured based on the captured image data; and
   computation means for computing, as the first gain, a manual white balance gain using the type of fluorescent light determined by the fluorescent type determination means as a type of light source designated by the user;
   second gain computation means for computing from the captured image data, as a second gain, a white balance gain in accordance with a second light source condition; and
   an intermediate calculation means for calculating one or more parameters for each pixel, and outputting an intermediate calculation result, wherein both of the first and second gain computation means use the intermediate calculation result outputted by the intermediate calculation means for computing the first and second gain.

2. A digital camera according to claim 1, wherein the intermediate calculation result includes a representative value of color values of a plurality of pixels forming each block.

3. A digital camera according to claim 1, wherein the second gain computation means includes:
   contribution level computation means for obtaining a contribution level of each light source type to a whole image based on the representative value of each block;
   light source type determination means for determining a light source type at the time of image capturing based on the contribution level which is computed; and
   computation means for computing, as the second gain, an auto white balance gain in accordance with the light source type which is determined, and wherein
   the contribution level computation means further includes specification means for specifying a block which falls within a color range for which erroneous determination of a light source type is likely to occur and excludes the block specified by the specification means when computing the contribution level.

4. A digital camera according to claim 3, wherein the color range for which erroneous determination of a light source type is likely to occur is a portion of a color range of a white object under each light source which is similar to a color range of a colored object under another light source.

5. A digital camera according to claim 1, further comprising:
   RAW image file output means for outputting RAW data obtained by digitizing an image capturing signal captured by imaging means in the form of an RAW image file, wherein
   when outputting the RAW image file from the RAW image file output means,
   the first gain computation means and the second gain computation means compute the first gain and the second gain, respectively, which are white balance gains of the RAW data, and
   the RAW image file output means records the first gain and the second gain which are computed in a header of the RAW image file.

6. A gain computation method for computing at least two types of white balance gains with regard to one image data item, comprising:
   a first gain computation step for computing from the image data item, as a first gain, an auto white balance (AWB) gain in accordance with a first light source condition;
   a second gain computation step for computing from the image data item, as a second gain, a manual white balance (MWB) gain in accordance with a second light source condition designated by the user, wherein fluorescent light is designated by a user as the second light source condition, and the second gain computation step includes:
   determining a type of fluorescent light which was used as a light source when an image was actually captured based on the captured image data; and
   computing, as the second gain, a manual white balance gain using the determined type of fluorescent light; and
   an intermediate calculation step for calculating one or more parameters for each pixel, and outputting an intermediate calculation result, wherein both of the first and second gain computation means use the intermediate calculation result outputted by the intermediate calculation means for computing the first and second gain.

* * * * *